(12) United States Patent
Blandina

(10) Patent No.: US 9,849,724 B2
(45) Date of Patent: Dec. 26, 2017

(54) ANTI-AQUAPLANING DEVICE FOR A VEHICLE

(71) Applicant: EASY RAIN I.S.R.L., Pordenone (PN) (IT)

(72) Inventor: Giovanni Amos Blandina, Pordenone (IT)

(73) Assignee: Easy Rain I.S.R.L., Pordenone (PN) (IT)

( * ) Notice: Subject to any disclaimer, the term of this patent is extended or adjusted under 35 U.S.C. 154(b) by 0 days.

(21) Appl. No.: 14/403,904

(22) PCT Filed: May 3, 2013

(86) PCT No.: PCT/IB2013/053528
§ 371 (c)(1),
(2) Date: Nov. 25, 2014

(87) PCT Pub. No.: WO2013/179159
PCT Pub. Date: Dec. 5, 2013

(65) Prior Publication Data
US 2015/0102594 A1    Apr. 16, 2015

(30) Foreign Application Priority Data
Jun. 1, 2012  (IT) .............................. PN2012A0028

(51) Int. Cl.
*B60B 39/02*        (2006.01)
*B60B 39/10*        (2006.01)

(52) U.S. Cl.
CPC .......... *B60B 39/026* (2013.01); *B60B 39/025* (2013.01); *B60B 2900/3312* (2013.01)

(58) Field of Classification Search
CPC ........ B60K 28/00; B60K 28/16; B60B 39/02; B60B 39/026; B60B 39/027; B60B 39/028

See application file for complete search history.

(56) References Cited

U.S. PATENT DOCUMENTS 3,289,668 A * 12/1966 Drucker ..................... 126/271.1
3,699,334 A * 10/1972 Cohen ................... H01J 37/304
                                                            204/192.34

(Continued)

FOREIGN PATENT DOCUMENTS

DE           3619191 A1      12/1987
DE       195 16 958 A1      11/1996

(Continued)

OTHER PUBLICATIONS

International Preliminary Report on Patentability dated Dec. 11, 2014, issued in PCT Application No. PCT/IB2013/053528, filed May 3, 2013.

(Continued)

*Primary Examiner* — Frank B Vanaman
(74) *Attorney, Agent, or Firm* — Workman Nydegger

(57) ABSTRACT

Device to avoid the aquaplaning problem on a vehicle (10), the device being applicable at least on the drive wheels (28) of the vehicle and including a tank (12) of fluid under pressure that is connected to a plurality of fluid ejectors (26) associated with the respective wheels and suitable to shoot jets of pressurized fluid onto the road surface, and sensors (18) suitable to detect the conditions of the road surface to actuate the fluid ejectors. The fluid ejectors (26) are injector nozzles controlled by a central processing unit (CPU), which receives the signals from the sensors (18), and are operated in a manner coordinated with the physical position of the respective wheel so as to be continually oriented in the direction of travel of the same wheel.

13 Claims, 5 Drawing Sheets

(56) References Cited

U.S. PATENT DOCUMENTS

| | | | | |
|---|---|---|---|---|
| 4,063,606 | A | * | 12/1977 | Makinson ..................... 180/271 |
| 4,101,074 | A | * | 7/1978 | Kiwior ................. F02M 51/005 |
| | | | | 239/585.4 |
| 4,725,105 | A | * | 2/1988 | Brown ................. B60T 8/4018 |
| | | | | 303/116.4 |
| 4,856,850 | A | * | 8/1989 | Aichele ................ B60T 13/662 |
| | | | | 188/156 |
| 5,301,996 | A | * | 4/1994 | Theis ......................... 296/180.1 |
| 5,927,329 | A | * | 7/1999 | Yie ........................ A62C 31/02 |
| | | | | 137/624.13 |
| 6,270,118 | B1 | | 8/2001 | Ichikawa |
| 6,488,217 | B1 | * | 12/2002 | Donastorg ................... 239/131 |
| 6,848,726 | B1 | * | 2/2005 | Horsham .......................... 291/3 |
| 2004/0103641 | A1 | * | 6/2004 | Maisch ................. B01D 53/90 |
| | | | | 60/272 |
| 2008/0014103 | A1 | * | 1/2008 | Cooke ................... F01N 3/2066 |
| | | | | 417/410.1 |
| 2008/0239876 | A1 | * | 10/2008 | Norris .................... G08B 15/00 |
| | | | | 367/139 |
| 2012/0073898 | A1 | * | 3/2012 | Holzinger .................. B60J 7/22 |
| | | | | 181/211 |

FOREIGN PATENT DOCUMENTS

| | | |
|---|---|---|
| EP | 2 058 141 A1 | 5/2009 |
| EP | 2 377 692 A1 | 10/2011 |
| WO | 99/54153 A2 | 10/1999 |
| WO | 01/39992 A1 | 6/2001 |
| WO | 2005/097521 A1 | 10/2005 |

OTHER PUBLICATIONS

International Search Report dated Oct. 16, 2013, issued in PCT Application No. PCT/IB2013/053528, filed May 3, 2013.
European Office Action dated Mar. 16, 2017, in Application No. 13 731 889.5.

* cited by examiner

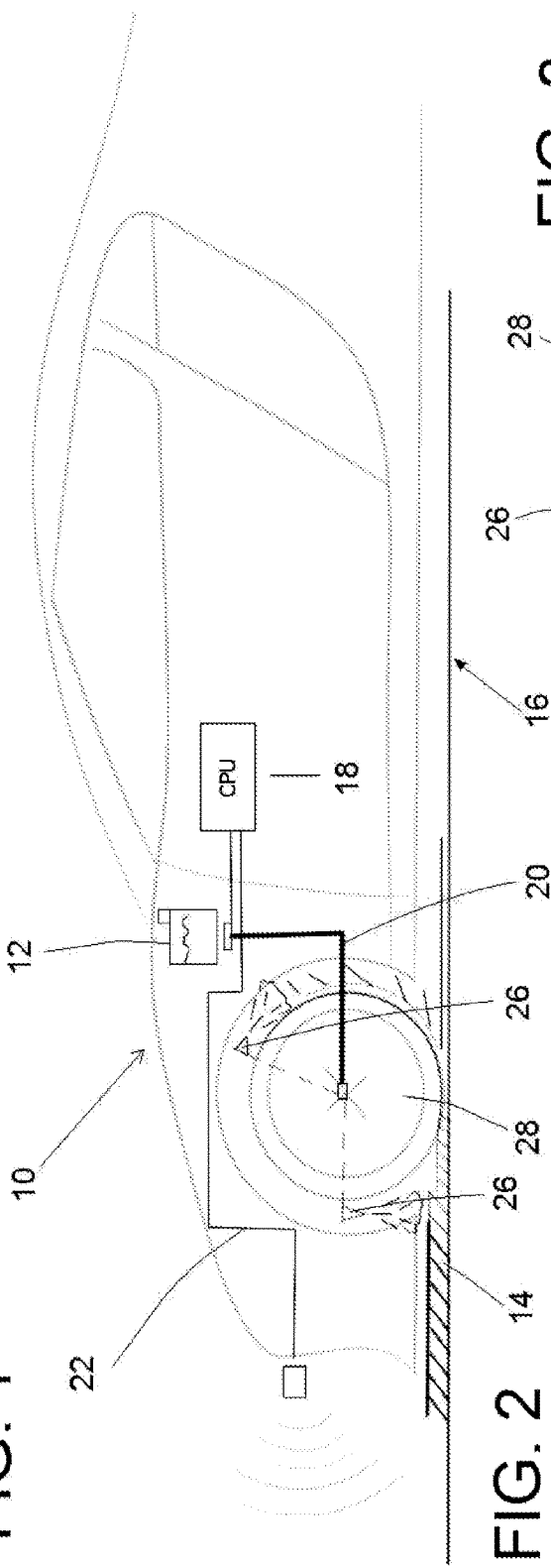
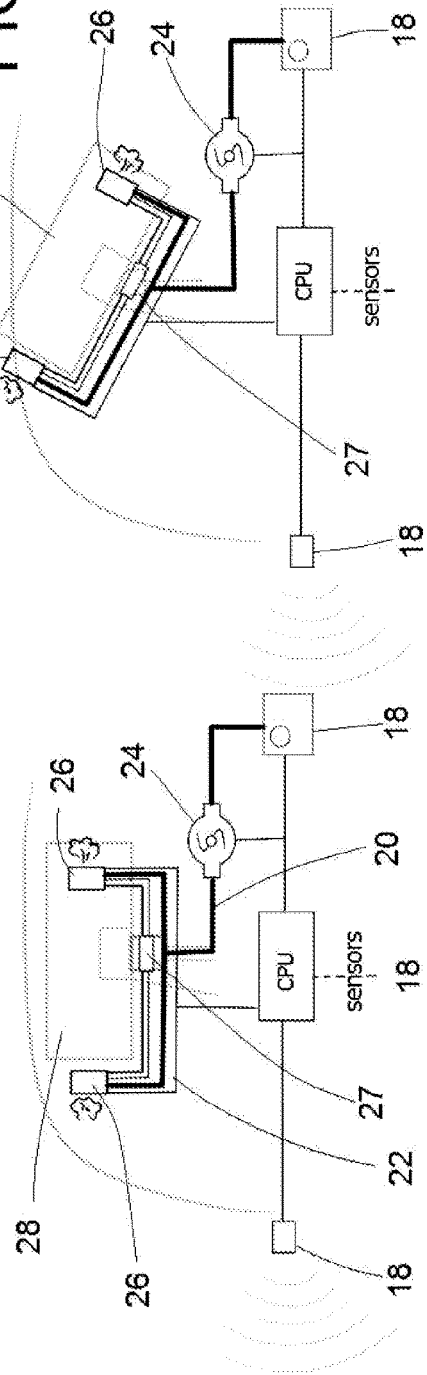
FIG. 1
FIG. 2
FIG. 3

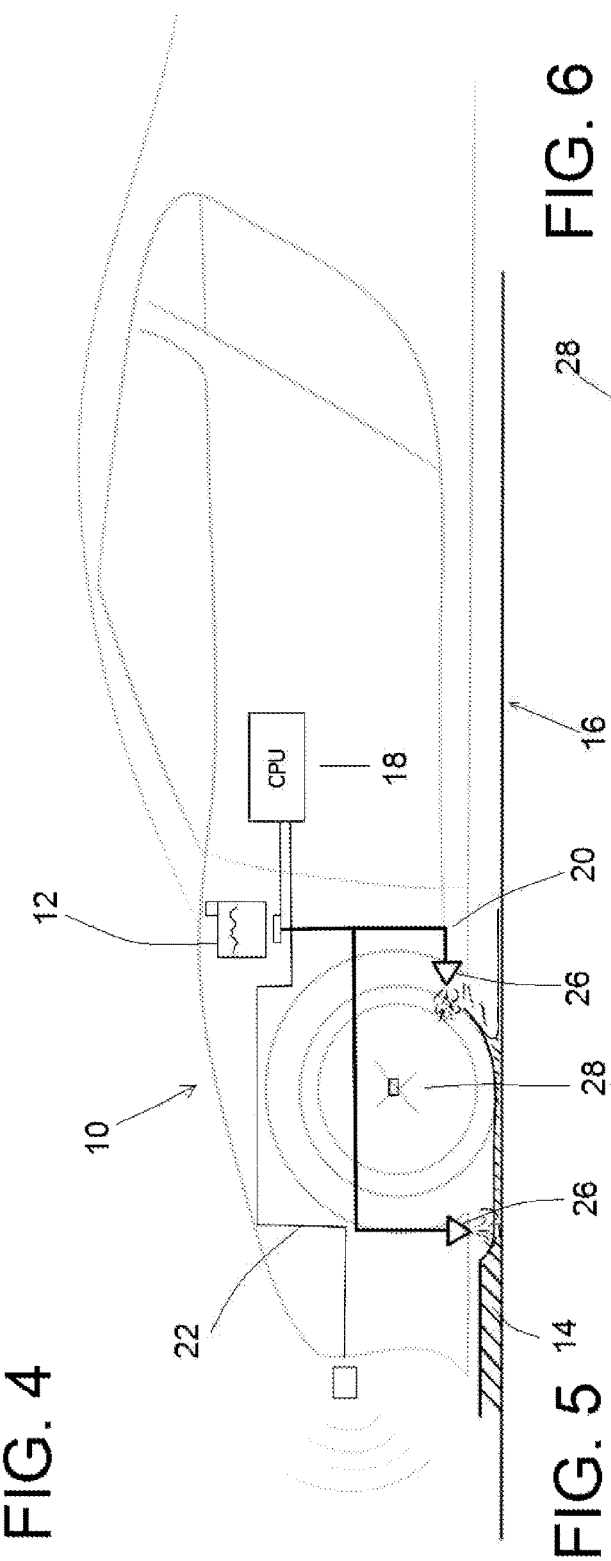
FIG. 4
FIG. 5
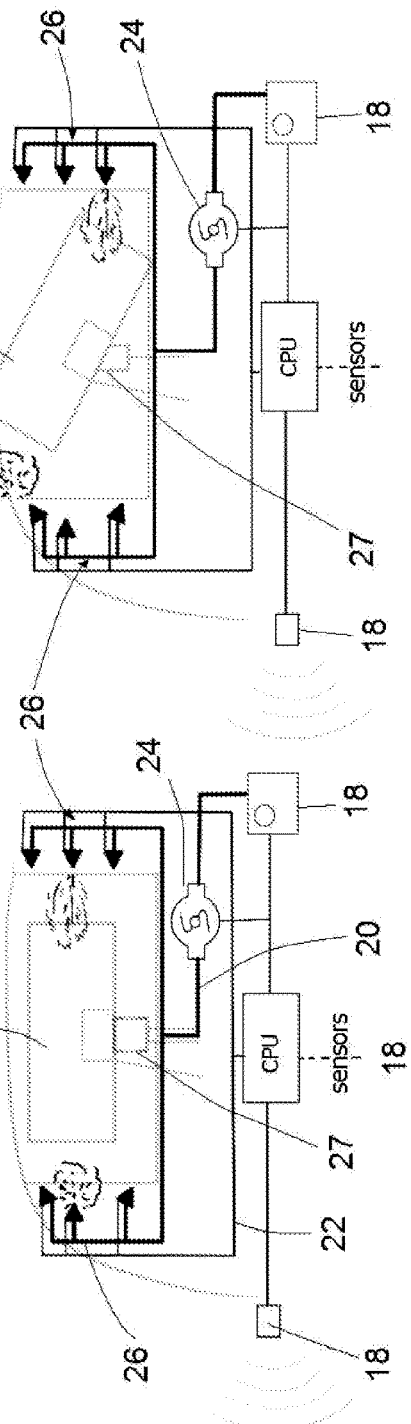
FIG. 6

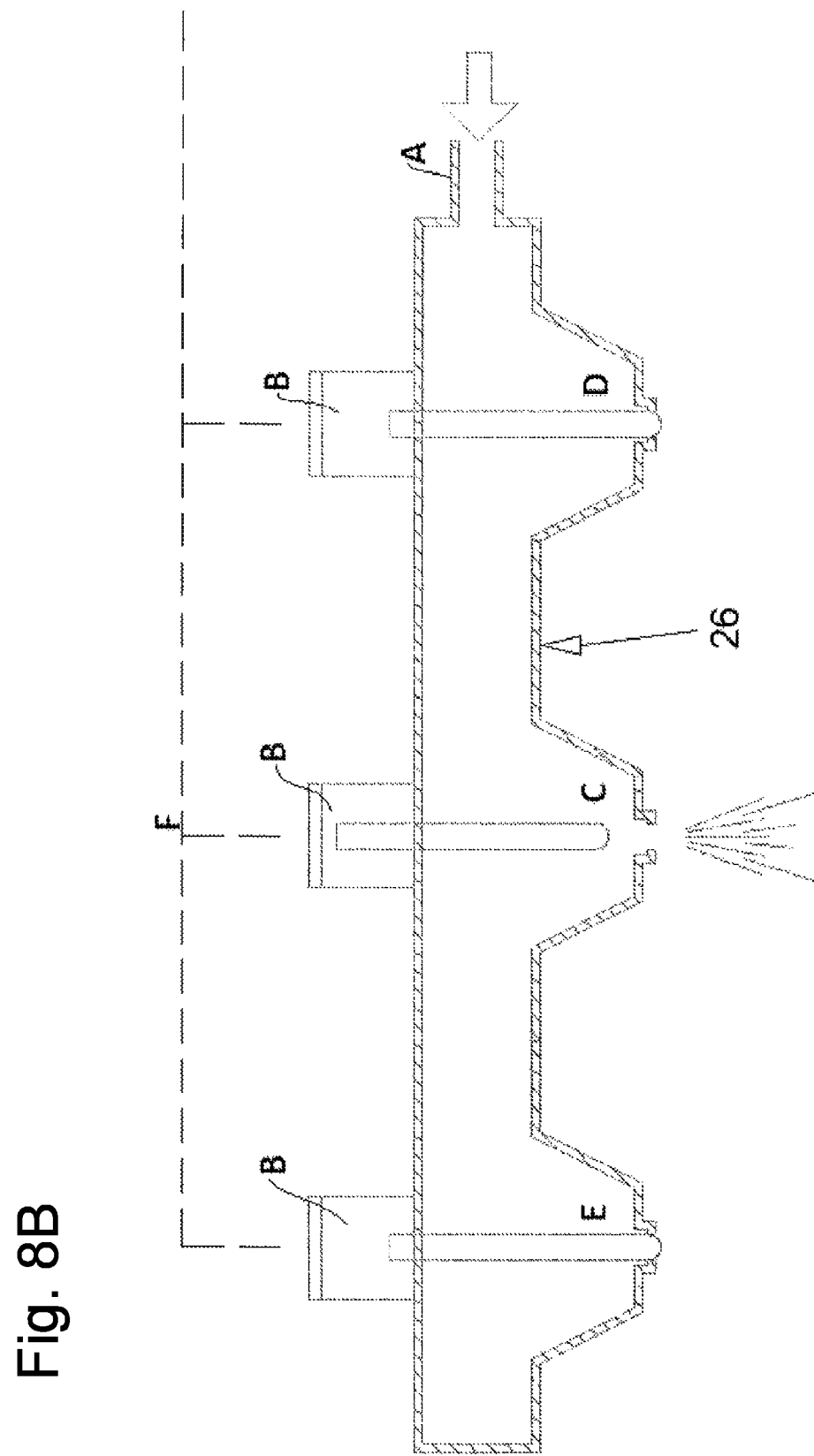

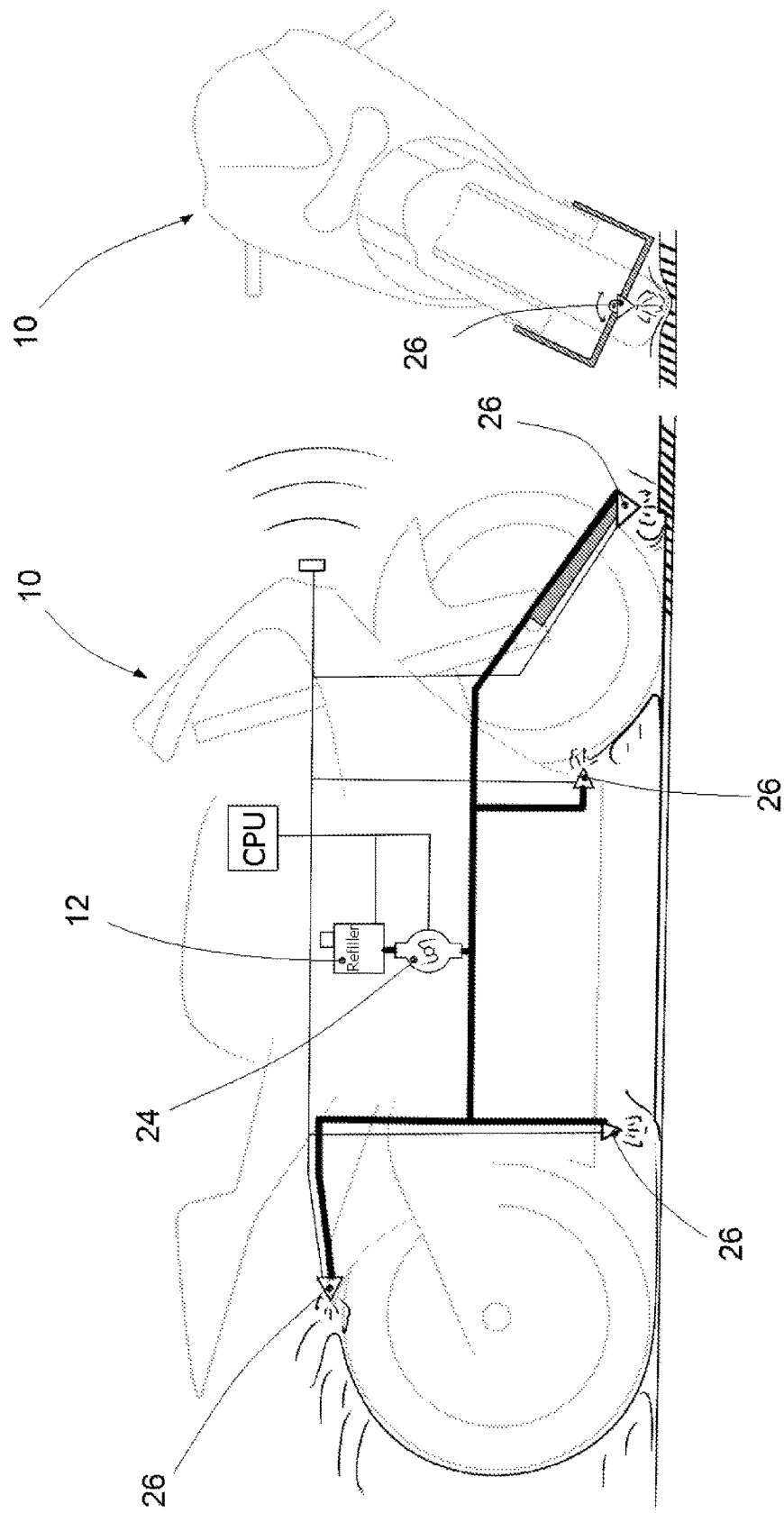

ANTI-AQUAPLANING DEVICE FOR A VEHICLE

TECHNICAL FIELD OF INVENTION

The present invention relates to a device for forestalling the problem of aquaplaning, such as when a layer of water between the wheels of a vehicle and the road surface leads to a loss of contact and traction of the wheels on the pavement. The problem occurs when the thickness of the layer of water is greater than the depth of the treads on the tyres, posing a serious driving safety hazard.

BACKGROUND OF THE INVENTION

Various solutions have been studied and proposed, such as the application of "draining" asphalts that prevent the pooling of water, or the construction of tyres with particular tread designs. However, if there is an excessive quantity of water, the drainage of the asphalt is not guaranteed, and the normal wear of the treads progressively reduces their capacity to expel water.

A different approach to solve the aquaplaning problem lies in the use of devices that are mounted close to the wheels of the vehicle, particularly the driving wheels, and that shoot jets of liquid or gas onto the road surface to remove the layer of water that pools on such surface. Devices of this type also make it possible to clean, within certain limits, the road surface from different materials present there, such as sand, leaves and litter in general.

The most recent document that describes a device such as those mentioned above is European Patent EP 2 058 141. This device consists substantially of at least a nozzle, arranged in a fixed position on the vehicle near a respective tyre and fed with a pressurized gas contained in a suitable tank. The tank is connected to a compressor and is provided with a control valve. In addition, a series of deflectors, parallel to or slightly inclined with respect to the trajectory of the water raised and ejected by the tyre, are positioned along the perimeter of the wheels. The duct that delivers the compressed gas to the nozzle is also connected to a dynamic air intake, mounted on the front of the vehicle.

The solution of the EP 2 058 141 patent presents various drawbacks.

The first is represented by the fact that the operation is ensured only when the vehicle is travelling a straight path. In fact, if a wheel is veered, the respective jet of gas remains fixed with respect to the vehicle, that is, it does not follow the path travelled by the wheel, with the result of worsening the aquaplaning problem, as it removes the water from an area of the road surface that is not reached by the wheel and ejects it to the area toward which the wheel is directed.

A second drawback of the EP 2 058 141 patent lies in the fact that the deflectors are fastened to the wheel wells and thus can easily become fouled with mud and general dirt, reducing their effectiveness to the critical point of completely obstructing the passage of water. Also, even the front dynamic air intake, although it is provided with a screen, is subject to clogging, making the system unstable and uncontrollable.

A further problem is due to the fact that said system works only in ideal and not real conditions, due to the many design factors that could alter its performance, including the theoretical overpressure generated by the dynamic air intakes in front of the bumper that is added to the pressure generated by the system. This overpressure is directly proportional to the speed of the vehicle, and also depends on the cleanliness of the filters contained in the ducting system.

Finally, the EP 2 058 141 patent allows for a continuous flow of gas to expel the water from the road surface. This solution is potentially very dangerous, due to the fact that when the anti-aquaplaning system is applied the vehicle would suddenly be in conditions of good roadway contact, that is, with a good grip on the pavement, which will force the driver to take an abrupt and immediate action to control the vehicle.

The international patent application WO 01/39992 describes a method and a device for improving the driving safety of a vehicle in case of water, snow or similar conditions on the roadway. Jets of air are used in front of the wheels, the jets being mobile and/or adjustable and being controlled by a data processing system on the basis of information from sensor means that detect the operating parameters (wheel positions, transversal acceleration, angular speed, etc.) of the vehicle. However, it is not anticipated that the jets will also be operated as a function of the conditions of the road surface. Moreover, the jets are operated in continuous mode.

The German patent application DE 3619191 describes a method and a device for improving the braking action of a vehicle, in particular on an icy roadway. The document envisages the ejection of granulated material through dispensers fastened to the frame in front of the vehicle wheels.

SUMMARY OF THE INVENTION

One purpose of the present invention is to propose a device for forestalling the aquaplaning hazards of a vehicle that overcomes the drawbacks of the solutions known in the field so as to offer a greater operational safety and reliability.

Another purpose of the invention is to propose a device that adapts effectively and automatically to the different conditions of operation of the vehicle, without eventually suffering any degradation caused by particular roadway conditions.

A further purpose of the invention is to propose a device equipped with control elements as simple as possible and coordinated with the safety systems already normally found on road vehicles.

These and other purposes of the invention are achieved with the device according to the invention having the characteristics laid down in the enclosed claims.

BRIEF DESCRIPTION OF THE DRAWINGS

Advantages and characteristics of the device according to the invention will become evident from the description that follows, with reference to the enclosed drawings, wherein:

FIG. 1 is a sidewise profile of the front part of a car with the outline of a first application of the device according to the invention;

FIG. 2 illustrates schematically a detail of FIG. 1 in a first operating condition;

FIG. 3 illustrates schematically the detail of FIG. 2 in a second operating condition;

FIG. 4 illustrates a lateral profile of the front part of a car with the sketchy outline of a second application of the device according to the invention;

FIG. 5 illustrates schematically a detail of FIG. 4 in a first operating condition;

FIG. 6 illustrates schematically the detail of FIG. 4 in a second operating condition;

FIG. 8 B illustrates schematically a further variant of the device according to the invention;

FIG. 9 schematically illustrates in a side view the outline of a motorcycle equipped with the device according to the invention;

FIG. 10 shows the motorcycle of FIG. 9 in a schematic front view.

DETAILED DESCRIPTION OF THE INVENTION

Figure 7:
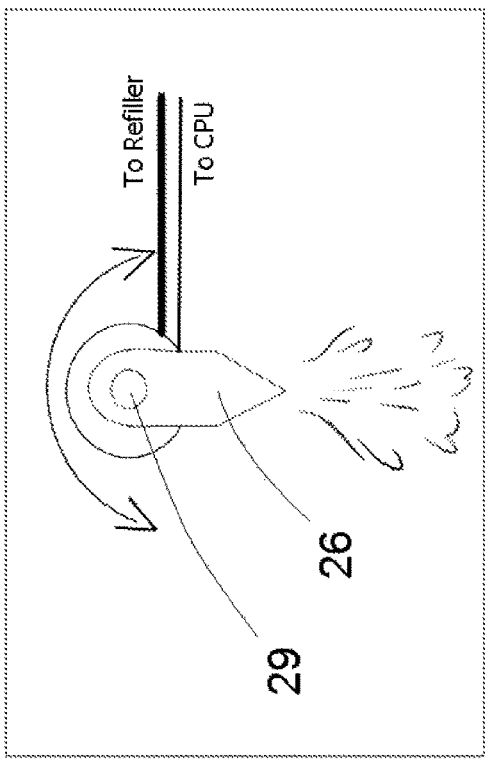
FIGS. 7 and 8 illustrate schematically two details of the device according to the invention.

The device according to the invention, as shown in FIGS. 1 to 3, is made up of a series of main macro-blocks and of additional elements, all integrated in a vehicle (10).

A first macro-block consists of a tank (12) in which is contained the fluid to use to remove the layer of water (14) present on the road surface (16) that causes aquaplaning. The tank can hold air, water, or fluid mixtures. The operation of filling the tank is normally carried out by the user. If the fluid is water, the tank will be filled in the same manner used to fill the tank of the windshield wiper fluid. If the fluid is air, the tank will be filled the same way a tyre is inflated. The tank will always and in all cases be controlled electronically, to check the level of the fluid in it, its efficiency, and to instruct the driver to "fill up" or to carry out other operations, in addition to avoiding any possible freezing.

A second macro-block includes a plurality of sensors (18) necessary to detect the state of the vehicle (10) and the condition of the road surface (16), so as to prevent the aquaplaning problem. The sensors can be already present on the vehicle, and therefore their use is shared with other systems in order to reduce costs (for example, the ABS or ESP sensors, which could indicate: vehicle speed, vehicle acceleration, angular speed for each individual wheel, steering angle, presence of water on the road surface, braking condition, etc.). Among these is included the vehicle speed sensor to determine the km/h at which the vehicle is travelling, the angular speed sensor for each individual wheel, to determine if all the wheels rotate at the same speed, if the vehicle is making a turn, or if one or more wheels are suddenly accelerating or decelerating. Rain sensors, to determine if it is raining, an accelerometer and gyroscope, to determine any tilting of the vehicle, water sensors to determine if and how much water the wheel is displacing. The sensor that determines the steering angle is necessary to understand if the vehicle is proceeding on a straight or a curving road. To these are added, for example, the important feedbacks of the ABS and ESP systems and of the other safety systems installed on the vehicle. It is also possible to install sensors specifically designed and conceived for the system, such as for example a sensor that makes it possible to verify the presence of an anomalous layer of water about to be reached by the vehicle (for example, an infrared sensor), or sensors adjacent to the wheel that detect the quantity of water displaced by the tyre.

Another macro-block includes the piping system for the fluid and the electrical equipment. This part of the system comprises all the connections that link up and allow all the other blocks and elements to work. In the figures, the fluid ducts (20) are shown with bold lines, and the electrical conductors (22) are shown with thin lines.

A further element is represented by a pump (24) to generate the operating pressure of the fluid contained in the tank (12). This element is not essential. In fact, if the tank is of the type filled with compressed air, evidently it would not be necessary to create an overpressure. It would be sufficient to have the pressure of the air inside the tank, generated by an air compressor (not shown). In other variants, the pump (24) could be installed not between the tank and the injectors (described later) but it could instead be connected directly to the injectors.

Another macro-block is made up of a plurality of injectors (26), from which jets of fluid are ejected to remove the layer of water (14) present on the road surface (16) that causes aquaplaning. The injectors (26) are connected through the ducts (20) to the pump (24) and to the tank (12). The injectors (26) are mounted in positions adjacent to a wheel (28) or to a wheel well, fender, bumper, underbody, braces, suspensions, etc., and must be protected with known means (for example, electrical heating elements) to avoid the formation of ice that would hinder their operation.

According to the main characteristic of the invention, the injectors (26) must be capable of "following" precisely and continually the direction of the wheels (28), not only on the straight stretches but also on curves. The injectors (26) may be fixed or mobile.

Figure 8:
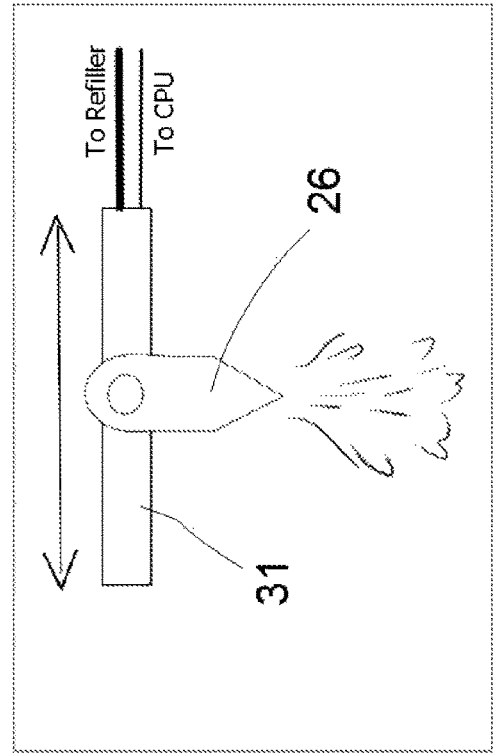

In the case in which the injectors (26) are mounted with the possibility of moving on the vehicle (FIGS. 1-3), they can be arranged so as to rotate on an axis contained within the longitudinal plane of the respective wheel (28), and/or move along a guide rail parallel to the longitudinal plane of the respective wheel. Three possible solutions are identified, as examples. The first solution consists of injectors mounted on a support (27) that is integral with the wheel axis (FIGS. 1-3) and that follows the movements of the wheel (also in the case of rear steering wheels). The second solution considers the use of injectors mounted on the wheel well, or in adjacent areas. In this case, the injectors can be rotated on their central axis (29, FIG. 7) by means of a powered and electronically controlled part in relation to the steering angle, or in the case of motorcycles also as a function of the leaning angle. A third solution considers the injector mounted in areas adjacent to the wheel and capable of moving along an electronically controlled magnetic or mechanical guide (31, FIG. 8).

In this case, when the wheel is steered, the injector follows the movement of the wheel by running along the guide rail. One last solution considers the combination of the latter two types of injectors described above, that is, capable of moving along a guide rail and at the same time rotating on an axis.

In the case in which the injectors (26) are mounted in fixed positions on the vehicle (FIGS. 4-6), at each wheel will be provided at least two (preferably three) injectors oriented at such an angle as to cover the total breadth of the steering range of the wheel. In addition, based on the type of injectors used, it will also be possible to vary the respective jet of fluid, by increasing or decreasing the aperture of the nozzle and the energy of the jet.

In each case, it is convenient to apply the device according to the invention in the area of the front wheels, since the aquaplaning problem first occurs typically in front of the front wheels.

In addition, it must be possible to have the continuous orientation of the device in the same direction of travel of the vehicle independently of the state of the directional wheels. In fact, it may be that the vehicle is in a pronounced understeering and therefore, even if the wheels are steered to the right, it is necessary to "clean" the left side of the road to eliminate aquaplaning and the understeering.

Remaining within the scope of the invention, a further variant can be contemplated in the construction of the injectors (26). This variant (FIG. 8 B) is represented by the use of a so-called "multipoint" injector, characterized by having the simplicity of connection of a "single-point" injector to the source of the fluid and the versatility of operation equivalent to a plurality of injectors arranged at strategy points or with specific orientations. As shown, the multipoint injector is connected to the source of fluid through a single duct (A) and is provided with individual nozzles (C, D, E) that are opened selectively through respective valves (B). The valves (B) are piloted by a CPU control unit (the operation of which will be described later) through a control "bus" (F). In this manner, for example, the central injector (E) will be opened with a frequency calculated on the basis that the vehicle is proceeding in a rectilinear direction and the directional wheels are following the path of the vehicle, that speed has a certain value, etc. There may also be the condition in which the central injector (E) is opened with a certain frequency and with a duty cycle of 60%, while the injector (D) is opened with a different frequency and a duty cycle of 30%. This condition may depend on the fact that the CPU has sensed that the vehicle is proceeding on a straight course, and that the wheels are in counter-steering position with respect to the direction of travel.

These injectors may be mounted on all types of vehicles and with all the wheels, including front-drive, rear-drive, four-wheel drive vehicles, with two steering wheels, four steering wheels, and in general on all types of wheeled vehicles, regardless or the number of steering, driving or free axles. It should be noted in particular that, in the case in which the device is mounted on a single-track wheeled vehicle (motorcycle, scooter, or similar), the injector, in addition to following the steering angle, is also capable of following the leaning angle of the vehicle.

A further important characteristic of the invention is represented by the fact that, contrary to the teachings of the prior art, the injectors (26) are intermittently operated, that is, their jets are not continuous. This allows the driver to control the vehicle in an extremely easy and safe manner, with particular reference to the transitory conditions of starting and stopping the anti-aquaplaning device. In other words, for a real and effective control of the aquaplaning problem, it is necessary to make the jets of fluid that impact upon the road surface "dynamic".

The functions of the injectors (26) are, then, specific, based on their respective position of installation on the car. The injectors mounted before the tyres, or also laterally to the tyres but so as to direct their jet in front of the tyres, have the function of removing the water from the road surface in front of the tyres. The flow of fluid will be directed toward the road surface and will follow the direction of the wheels during steering. The injectors mounted above or behind the tyres have the function of "breaking" the flow of water that is directed backward, with respect to the direction of travel of the vehicle, by centrifugal effect.

A central processing unit (CPU) installed on the vehicle (10) is connected through the electrical connections (22) to all the macro-blocks and to the elements that make up the device to counter the aquaplaning problem. The function of the CPU is to determine, based on the values detected by the sensors (18), the times and manners of operation of the device, in addition to communicating with all the other safety systems.

The interaction with the sensors (18) can be achieved both by polling sensors already integrated in the vehicle and by controlling sensors that are specifically mounted on the vehicle and therefore far its exclusive use. The CPU has two modes of potential intervention of the system. It may intervene and operate the system when the sensors have indicated that there is an impending aquaplaning problem: in this mode, the operation of the system has the function of dispelling the occurring problem and can help the other devices (ESP and ABS for example) operate correctly even with the wheels steered and in a curved and not rectilinear trajectory. The calculation method will favor an easy resumption of control of the vehicle on the part of the driver.

A second mode of operation is to prevent the occurrence of aquaplaning. Based on the conditioning of the sensors (18), in the dynamic state of the vehicle and of the remote sensors, the CPA activates the system and forestalls the aquaplaning phenomenon before it occurs. The calculation system will predispose the vehicle and the device so as to dodge the manifestation of such event. Naturally, there is an interface provided with the dashboard and an on-board diagnostics, in a well-known mode. As on the most modern safety devices, in this second circumstance the device will also be able to foresee an automatic braking of the vehicle so as to cut down speed before the danger point is reached.

The piloting of all the sensors (18) is very important. Once the CPU has determined the need to activate the device, it actuates the injectors (26). However, this comes about in an intelligent mode, in connection with the dynamic data of the car, steering angle, speed, yaw and in relation to the number of wheels involved in the aquaplaning. In this regard, the method, duration and pressure of the jets are calculated dynamically far each injector in real time, in relation to the conditions detected by the sensors and a mathematical algorithm that establishes their strength, intensity and duration. The CPU will calculate and drive toward the injectors an intermittent flow of fluid, meaning a discontinuous flow having any waveform, any period and duty cycle, and will also control the rate of flow of air or the quantity of fluid per unit of time used during the injection activation phase. This method of operation will allow the driver an easy control of the vehicle during the actuation of the system. The CPU, therefore, will not only control the rate of flow of the air, water or gas, but will also control in a dynamic mode the cycles of delivery of the air in each individual injector, instead of to one group or to all of them. It should be remembered that this strategy, in addition to being adopted to increase safety, is also used to exploit the overpressures that are created within the system itself and increase the efficiency and duration of the liquid or the fluid inside the tank. Another function of the CPU is diagnostics, in other words it will be able to constantly monitor the efficiency and proper operation of all the parts making up the device. The system also provides circuit washing and auto-test cycles. Naturally, the mode of operation is extended to all the wheels on the vehicle, and each wheel can be controlled individually or together with other wheels, thus determining a single-channel or multi-channel system. The same can be said for all the injectors, or all the pumps or tanks that may be installed. Ali the components present in the design can potentially be one or more than one, up to a number sufficient to guarantee the proper operation of the device.

The device according to the invention can be applied to any road vehicle. FIGS. 9 and 10 illustrate, for example, its application to a motorcycle, and the numerical references of the different components are the same as in the previous figures relative to a car.

In conclusion, the device according to the invention resolves the problems of the previously known devices through the use of a limited number of components that make the system particularly reliable. Moreover, the device is more efficient and safer, since the jets are operated so as to effectively follow the direction of travel of the wheels and are oriented toward the underbody of the car. The driving safety relative to the car is then enhanced by the intermittent operation of the jets.

The invention claimed is:

1. An anti-aquaplaning device to be installed on a vehicle, said device being associated at least to front or driving wheels of the vehicle, said device comprising:
   a tank of liquid connected to a plurality of means associated with the respective wheels and configured for producing jets of pressurized liquid onto a road surface, and
   sensor means configured for detecting conditions of the road surface and the vehicle in order to actuate said means for producing jets of pressurized liquid before the vehicle aquaplanes,
   wherein said means for producing jets of pressurized liquid comprise injector nozzles actuated by a central programming unit (CPU) receiving signals issued from said sensor means, and
   wherein said means for producing jets of pressurized liquid are controlled so that when actuated by the CPU based on signals from the sensor means, the jets of pressurized liquid for each of the injector nozzles are produced intermittently at a set frequency during the actuation, the CPU independently controlling the set frequency of the jets of pressurized liquid for each of the injector nozzles based on the signals from the sensor means so that the set frequency of the jets of pressurized liquid is different for each of the injector nozzles when corresponding signals are received from the sensor means.

2. The device according to claim 1, wherein said means for producing jets of pressurized liquid associated with each wheel comprises a single injector provided with a plurality of nozzles that are actuated individually and selectively, through respective solenoids, controlled by the central processing unit (CPU).

3. The device according to claim 1, wherein each injector nozzle is positioned on the vehicle and is configured to move along a guide rail parallel to a longitudinal plane of the respective wheel.

4. The device according to claim 3, wherein each injector nozzle is positioned on the vehicle and is configured to rotate around an axis contained on the longitudinal plane of the respective wheel and/or move along a guide rail parallel to the longitudinal plane of the respective wheel.

5. The device according to claim 1, wherein at least one of the injector nozzles comprises a multipoint injector, the multipoint injector comprising:
   a body bounding a compartment,
   an inlet duct formed on the body and communicating with the compartment, the inlet duct being in fluid communication with the tank of liquid,
   a plurality of outlet nozzles formed on the body and communicating with the compartment, and
   a plurality of valves coupled to the body and being configured to selectively open and close the plurality of outlet nozzles, the central programming unit (CPU) controlling the operation of the plurality of valves.

6. The device according to claim 1, wherein the liquid is water.

7. The device according to claim 1, wherein the CPU independently controls the set frequency of the jets of pressurized liquid for each of the injector nozzles based on signals from the sensor means that correspond to tilting of the vehicle.

8. The device according to claim 1, wherein the CPU independently controls the set frequency of the jets of pressurized liquid for each of the injector nozzles based on signals from the sensor means that correspond to angular speed of each individual wheel.

9. The device according to claim 1, wherein the CPU independently controls the set frequency of the jets of pressurized liquid for each of the injector nozzles based on signals from the sensor means that correspond to aquaplaning status of each wheel.

10. The device according to claim 1, wherein the CPU independently controls the set frequency of the jets of pressurized liquid for each of the injector nozzles based on signals from the sensor means that correspond to the speed of the vehicle.

11. The device according to claim 1, wherein the CPU independently controls the set frequency of the jets of pressurized liquid for each of the injector nozzles based on signals from the sensor means that correspond to the steering angle of the vehicle.

12. The device according to claim 1, wherein the sensor means is also configured to actuate said means for producing jets of pressurized liquid after the vehicle aquaplanes.

13. An anti-aquaplaning device to be installed on a vehicle, said device being associated at least to front or driving wheels of the vehicle, said device comprising:
   a tank of liquid connected to a plurality of means associated with the respective wheels and configured for producing jets of pressurized liquid onto a road surface, and
   sensor means configured for detecting conditions of the road surface and the vehicle in order to actuate said means for producing jets of pressurized liquid even before the vehicle aquaplanes,
   wherein said means for producing jets of pressurized liquid comprise injector nozzles actuated by a central programming unit (CPU) receiving signals issued from said sensor means, said injector nozzles being arranged at fixed positions on the vehicle, wherein at least two of the injector nozzles are provided at each wheel and are angularly oriented so that the jets of pressurized liquid produced therefrom cover an overall steering range of the wheels, and
   wherein said means for producing jets of pressurized liquid are controlled so that when actuated by the CPU based on signals from the sensor means, the jets of pressurized liquid are produced intermittently at a set frequency during the actuation, the CPU independently controlling the set frequency of the jets of pressurized liquid for each of the injector nozzles based on the signals from the sensor means so that the set frequency of the jets of pressurized liquid is different for each of the injector nozzles when corresponding signals are received from the sensor means.

* * * * *